W. DIETER.
TORPEDO SHELL.
APPLICATION FILED JUNE 5, 1915.
1,151,763.
Patented Aug. 31, 1915.
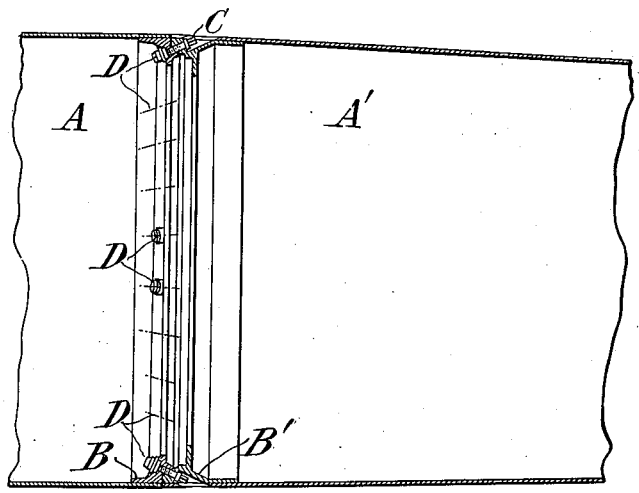
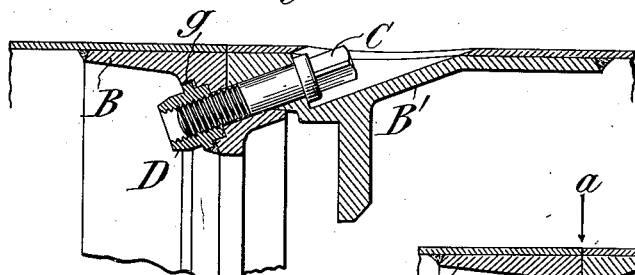
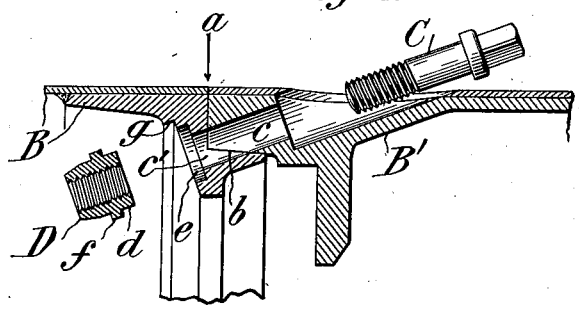
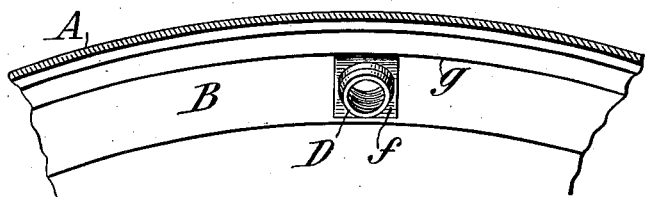
WITNESSES:
René Spuine
Fred White
INVENTOR:
William Dieter,
By Attorneys,
Fraser, Dunk & Myers

UNITED STATES PATENT OFFICE.

WILLIAM DIETER, OF NEW YORK, N. Y., ASSIGNOR TO E. W. BLISS COMPANY, OF BROOKLYN, NEW YORK, A CORPORATION OF WEST VIRGINIA.

TORPEDO-SHELL.

1,151,763.  Specification of Letters Patent.  Patented Aug. 31, 1915.

Application filed June 5, 1915. Serial No. 32,290.

*To all whom it may concern:*

Be it known that I, WILLIAM DIETER, a citizen of the United States, residing in the borough of Brooklyn, county of Kings, city and State of New York, have invented certain new and useful Improvements in Torpedo-Shells, of which the following is a specification.

This invention relates to means for uniting two sections of the shell of a torpedo, mine, bomb, or similar structure.

The invention is especially designed for uniting the successive sections of the shell or casing of an automobile torpedo; but is equally applicable to the joining of other sectional shells.

It has heretofore been common to apply within the adjoining edges of the shell sections to be united, a pair of strengthening rings, and to fasten these rings together by screws passing through holes in one ring and screwing into the other. It has heretofore been customary to make these rings of bronze, the threads of the screws engaging threaded holes tapped in the bronze ring. This insures against the rusting together of the screwthreads, and affords a desirable but expensive construction. It has also the disadvantage that if the internal threads for any screw become stripped, that screw becomes useless, and it is usually necessary to replace the entire ring.

The present invention provides an improved construction whereby the joint is made stronger and the screws are engaged with individual nuts, thereby securing important practical advantages.

In the accompanying drawings,—Figure 1 is a longitudinal mid-section of a sectional shell showing its joint; Fig. 2 is an enlargement of Fig. 1; Fig. 3 is a fragmentary transverse section showing part of the device in elevation; Fig. 4 is a view similar to Fig. 2 but showing the parts separated.

A A' are the shell sections to be united. B B' are the respective joint-rings for uniting these shell sections. They are riveted or otherwise fastened to the respective shell sections. These rings are commonly made with perpendicular meeting faces in the plane $a$ Fig. 4, and with conical meeting faces $b$, whereby they are centered.

C C are the fastening screws or bolts which pass through holes $c$ bored through the ring B', these being commonly on oblique axes as shown. Heretofore the screws have engaged threads cut in the ring B, which has been made of bronze or other non-rusting metal, and of considerably greater thickness than here shown to afford room for the requisite threads.

According to the present invention the ring B is not threaded but has holes $c'$ bored through it, and nuts D are applied to this ring, being centered with the bores $c'$ to be engaged by the threads of the screws C. For thus centering the nuts, each nut is formed with a boss $d$ which enters a counterbored socket $e$ (Fig. 4). To prevent the nuts from turning they are made with a square flange $f$ one side of which comes against a flange or shoulder $g$ formed on the ring B. To hold the nuts in place until the rings have been united and the screws inserted, they are preferably soldered to the ring B.

This invention enables the ring B to be constructed of steel, which may be cheaply and accurately produced by the operations of hydraulic cupping and punching so as to require little or no machining, instead of forming this ring as heretofore of cast bronze which had to be accurately machined. The new construction is much cheaper and affords greater strength with less weight, besides avoiding the disadvantage heretofore experienced because of the impossibility of utilizing all of the bronze castings, many being defective and requiring to be thrown away after being machined and brought more or less toward completion, whereas the steel rings are invariably perfect.

The new construction has the same advantage as heretofore that the steel screws engage female threads in a part of non-rusting metal such as bronze. It has the further advantage that in case any of the internal threads are stripped or are or become imperfect, the one nut containing such threads can be separated and replaced by a perfect one. The threading of the separate nuts is much cheaper than the boring and threading of the oblique holes in the bronze ring heretofore used. The new construction has the further advantage that if as often happens a screw breaks off in the nut, it is not necessary to drill it out as has heretofore been required with the danger of spoiling the internal threads, but it is only necessary to drive out the broken screw and nut, the solder uniting the nut to the ring yielding so as to permit the nut to separate from the ring.

Any convenient construction whereby the nuts may be centered with reference to the respective bored holes, and whereby they may be held from turning, may be employed, the means shown being deemed preferable.

I claim as my invention:—

1. In a sectional shell having joint rings and screws for uniting them, the combination with one of said rings of nuts having non-rotative attachment thereto for receiving such screws.

2. In a sectional shell having joint rings and screws for uniting them, the combination with one of said rings of nuts attached thereto having centered non-rotative engagement therewith for receiving such screws.

3. In a sectional shell having joint rings and screws for uniting them, the combination with one of said rings having an annular shoulder of nuts fastened to said ring and having each a flat portion engaging such shoulder to hold the nut against rotation.

In witness whereof, I have hereunto signed my name in the presence of two subscribing witnesses.

WILLIAM DIETER.

Witnesses:
THOMAS F. WALLACE,
FRED WHITE.